Dec. 16, 1924.                                                               1,519,278
W. J. TURENNE
SUPPORTING BASE FOR HEATING UNITS OF FLATIRONS AND OTHER HEATERS
Original Filed Aug. 9, 1921
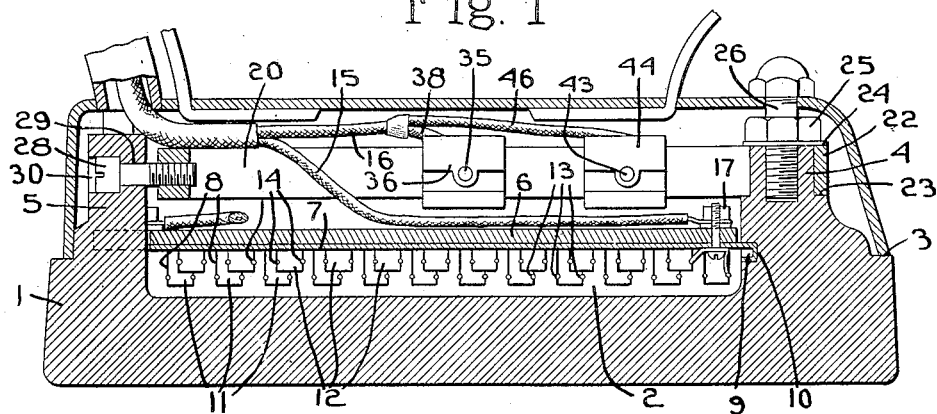
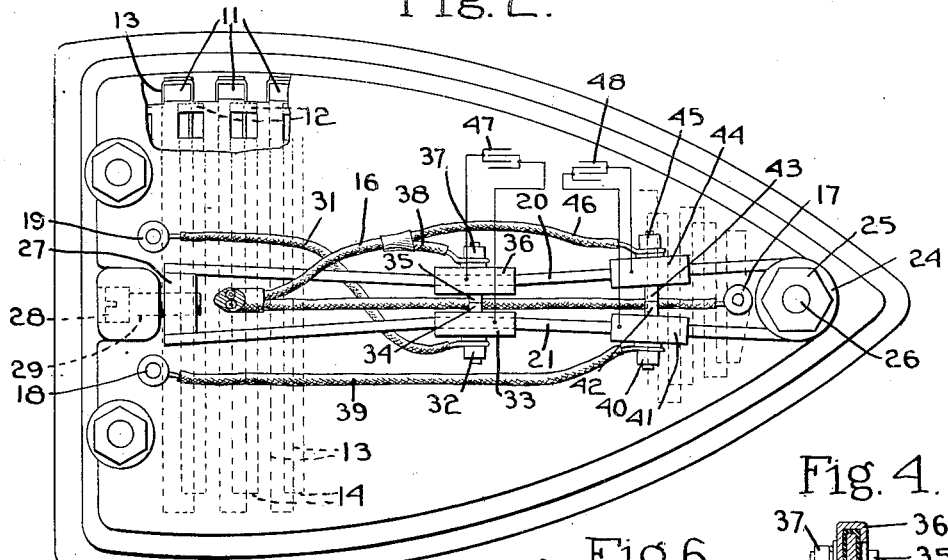
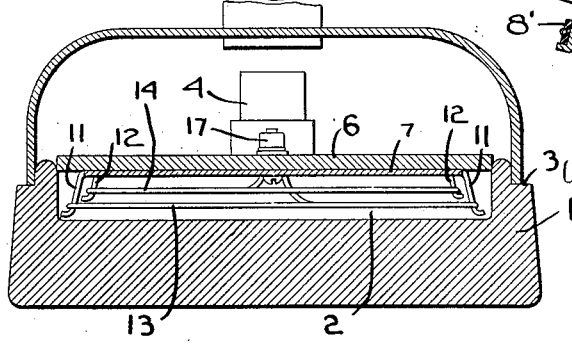
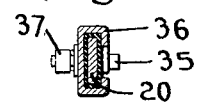
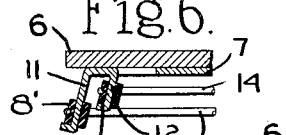
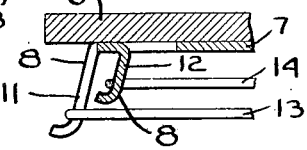
Inventor.
Wilfred J. Turenne
by Heard Smith & Tennant.
Attys.

Patented Dec. 16, 1924.

1,519,278

UNITED STATES PATENT OFFICE.

WILFRED J. TURENNE, OF DANVERS, MASSACHUSETTS.

SUPPORTING BASE FOR HEATING UNITS OF FLATIRONS AND OTHER HEATERS.

Original application filed August 9, 1921, Serial No. 491,051. Divided and this application filed June 9, 1922, Serial No. 567,097. Renewed April 22, 1924.

*To all whom it may concern:*

Be it known that I, WILFRED J. TURENNE, a citizen of the United States, and resident of Danvers, county of Essex, State of Massachusetts, have invented an Improvement in Supporting Bases for Heating Units of Flatirons and Other Heaters, of which the following description, in connection with the accompanying drawing, is a specification, like characters on the drawing representing like parts.

This invention relates to improvements in supporting devices for electric conductors and the principal object thereof is to provide a novel supporting base for a bare electric conductor, such as, a wire of a heating unit.

A further object of the invention is to provide a novel device of the character described for supporting a plurality of heating unit wires.

A further object of the invention is to provide a supporting base or heating unit in which said base is provided with a heat reflecting surface adapted to aid in projecting the heat upon the device which is to be heated.

More specifically the invention consists in providing a supporting plate for a heating unit having an enamel surface and provided with integral members bent from the plate, and also enamel-coated, adapted to support the wires of the heating unit.

A further object of the invention is to provide a novel heating unit construction for an electrically heated flat iron.

Other objects and features of the invention will more fully appear from the following description and the accompanying drawings and will be particularly pointed out in the claims.

The present application constitutes a division of my prior application No. 491,051, filed August 9, 1921, for improvements in thermostatically controlled irons.

A preferred embodiment of the invention is disclosed herein as applied to the heating unit construction of an electrically heated flat iron.

In the drawings:

Fig. 1 is a vertical, longitudinal, sectional view through a flat iron embodying the preferred form of my invention;

Fig. 2 is a plan view of the same, the cover plate having been removed and a portion of the insulating plate, which is supported by the heating unit, being broken away to show the construction of the tabs which support the wires of the electric heating unit;

Fig. 3 is a transverse sectional view illustrating particularly the form of the base member, the heating unit and means for supporting the same, the thermostatic controlling mechanism being omitted;

Fig. 4 is a vertical sectional view through one of the thermostatic members and the bracket for supporting the binding post which is mounted thereon; and, Fig. 5 is an enlarged detail sectional view of a portion of the heating unit including the insulating support and the plate having downwardly extending tabs which support the wires of the heating unit; and, Fig. 6 shows a modified means for insulating the wire-supporting tabs.

A preferred embodiment of the invention is illustrated in the accompanying drawings as applied to a flat iron of the usual domestic type, but it will be understood that the invention is adapted to be embodied in other types of electrically heated apparatus and also may be employed for supporting bare, that is to say, uninsulated conductors.

Broadly stated, the invention comprises a metallic plate or base having brackets extending therefrom, said brackets, and preferably the base also, being provided with a coating or covering of enamel or other non-conducting material preferably applied in a fluid or plastic state and thereafter baked or permitted to harden in place. An alternative construction is illustrated in Fig. 6 in which the tabs are shown as being insulated by a suitable tubular covering of insulating material slipped over the tabs and their ends thereafter bent to retain the insulation in place.

More specifically, the invention comprises a sheet metal plate having brackets formed by slotting the plate and bending therefrom into suitable shape supporting brackets or hooks adapted to support the wires of the conductor or heating unit, the brackets and preferably the plate also being coated with enamel or like insulating substance after having been bent into the desired form.

The invention is illustrated herein as embodied in the heating unit construction of a flat iron.

The flat iron comprises a base member 1 having a smooth flat under-surface which desirably is plated in the usual manner, a cavity 2 being provided for the heating unit. The upper portion of the base desirably is provided with a peripheral shoulder 3 upon which the cover of the iron is seated. This cavity may be formed by providing a separate hollow plate section, but preferably is formed as a chamber in the upper portion of the base member to receive the electric heating unit by which heat is transmitted to the base portion of the iron. The base desirably is also provided near its point with an upwardly extending boss 4, and another boss 5 also integral with the base of the iron extends upwardly from the central rear portion thereof.

The cavity 2 is provided with a suitable cover 6, preferably a sheet of asbestos or other insulating material, which is secured to and supported upon a plate 7 preferably of sheet metal which is provided with downwardly extending members to support the wires of the heating unit. These downwardly extending members are provided with a covering of insulation to prevent contact of the wires with the metal of the plate. The rear end portion of the plate and cover, which desirably is coextensive therewith, rests upon the upper surface of the body portion of the iron, while the tapered front end portion of the plate 7 desirably is provided with a reversely end portion 9 which extends into a suitable recess 10 in the end wall of the cavity 2.

The plate 7 desirably is provided along its lateral edges with a series, or preferably a plurality of series, of downwardly bent tabs 11 and 12 which are integral with the plate 7 and are covered with a coating 8 of insulating material. The coating is applied to the supporting members, and preferably also to the body of the plate, after the tabs have been bent into position.

Another means for covering the wire-supporting tabs with insulation is shown in Fig. 6 in which a sleeve 8' of insulating material is slipped over each tab and the end of the tab thereafter bent laterally to retain the sleeve in place.

The tabs 11 and 12 preferably incline outwardly from a plane vertical to the plane of the body of the plate and are provided with hook-shaped ends adapted to prevent the wires of the heating unit from dropping when the wire of the heating unit is expanded under the influence of heat. The tabs desirably also are provided with slight depressions to receive the wires, and hold them more firmly in position.

The series of tabs 11 are located in proximity to the side walls of the cavity 2, while the series of tabs 12 are located at a greater distance from the side walls of the cavity and preferably are shorter. Desirably the members of the series of tabs 11 are disposed in staggered relation to those of the series of tabs 12 as illustrated in Fig. 1.

The heating unit or units may be of the usual character comprising wires 13 and 14 of high resistance and which will not oxidize, such, for example, as "nichrome" wires. These wires are supported in the recesses in the sides of the tabs 11 and 12 and arranged to pass back and forth transversely of the base, or of the iron as illustrated in Fig. 2.

By reason of the staggered arrangement of the tabs of the different series the transverse wires 13 and 14 of the different heating units may be caused to alternate. By providing tabs of different lengths the different wires of the heating unit may be located in planes at different distances from the face of the base. The surfaces of the tabs, and preferably also the surface or surfaces of the base, are coated with enamel which serves to insulate the wires from the metal of the plate. The enamel surface of the plate also acts to reflect the heat and to project the same upon the base member of the iron.

While two heating units are illustrated in the present construction it is obvious that a greater or lesser number of heating units may be employed, and that the heating unit wires may be arranged in various other designs, such as, in a spiral, sinuous, or irregular configuration, by providing a plate of suitable construction.

Any suitable means may be provided to supply a proper electric current to the heating units. Preferably, electric circuits are employed which are provided with thermostatically operated controlling means by which the current supplied to one, or preferably all, of the heating units may be automatically regulated by thermostatic means which is responsive to the variations in the temperature of the iron so that the iron may be continuously maintained at a predetermined temperature.

Desirably means are also provided for adjusting the thermostatic controlling means in order that the temperature of the iron may be regulated in accordance with the work for which it is used.

In the preferred embodiment of the invention disclosed herein the electric circuit comprises two conductors 15 and 16 leading from a suitable generator or power circuit, one of said conductors 15 being connected to a binding post 17 which extends through the front end portion of the insulated cover 6 and plate 7 and is connected to the respective ends of the wires 13 and 14 of the heating units. The opposite ends of the wires 13 and 14 of the heating units are connected respectively to binding posts 18 and 19 which likewise extend through the plate 7 and insulating cover 6 and are connected at their upper ends respectively to branches of the conductor 16, suitable thermostatically operable switches or contact members being provided in said branches to control the current which is delivered to the respective heating units.

In the preferred embodiment of the invention disclosed herein the contact members of said branches of the electric circuit are carried by thermostatically controlled members or bars, having different coefficient of expansion than that of the base member, which are mounted upon the bosses 4 and 5 of the base or body member, the thermostatic members being so constructed and mounted upon the base member that the difference in expansion of said thermostatic members and the base member will cause said contact members to be closed or opened when the iron has been heated to certain predetermined temperatures.

In the preferred construction disclosed herein the thermostatic device comprises a bar, preferably of "invar" steel which, as is well known, has practically no coefficient of expansion. This bar is bent centrally of its length to form a somewhat U-shaped or hair pin shaped construction, the members or legs 20 and 21 of which are substantially parallel, but curved centrally for purposes which will hereinafter be described, and are connected by a loop 22. The looped portion 22 of the bar desirably is formed to fit a cylindrical portion of the boss 4 and desirably rests at its lower edge upon a shoulder 23 and is clamped upon said boss by a washer 24 and a nut 25 which is mounted upon a stud 26 which is screwed into a central socket in the boss 4. The ends of the members 20 and 21 of the thermostatic bar are connected rigidly to a cross head 27 which is provided with an aperture having screw threaded walls which are engaged by a screw 28 rotatably mounted in a journal 29 in the boss 5. The boss 5 desirably is provided with a countersunk recess 30 to receive the head of the screw 28.

As before stated the members or legs 20 and 21 of the thermostatic bar are curved. Preferably the curvature is such as to cause the members to converge somewhat at their central portion as illustrated in Fig. 2. It will be obvious that by reason of the fact that the members 20 and 21 of the thermostatic bar are anchored to the bosses 4 and 5, any greater expansion of the body portion of the iron, than that of the members 20 and 21 of the bar, will cause the curved portion of the bar to straighten. Inasmuch as the bar of "invar" steel has substantially no coefficient of expansion, the expansion of the body portion of the iron will serve to straighten the members 20 and 21 and consequently to separate the central portions thereof.

In the present construction the members of the switches or contact members, for controlling the circuit or circuits leading to the heating unit or units, are mounted upon the members 20 and 21 and are actuated by the latter to complete or break the circuit or circuits leading to the heating units. As illustrated in Fig. 2 a conductor 31, which is connected at one end to the binding post 19 of the inner or minor heating unit, is connected at its opposite end to a binding post 32 which is mounted in a bracket 33 which is secured to the thermostatic member 21, the bracket 33 being insulated from the member 20 and provided with a contact member 34. A complementary contact member 35 is similarly mounted upon a bracket 36 which is provided with a binding post 37 which is connected to a branch 38 of the conductor 16 which leads to the generator or power circuit.

The contact members 34 and 35 are normally in engagement, or closed, so that the current from the generator or power circuit passes through the conductor 15 and the binding post 17 and heating unit 14 to the binding post 19, thence through the conductor 31 and the binding post 32, contact members 34 and 35, to the binding post 37 and thence through the branch 38 and conductor 16 to the return wire of the generator or power circuit. When the circuit is thus completed the resistance of the heating unit will generate heat which will be transmitted to the body portion of the iron. As the temperature of the iron increases the body portion of the iron will expand while the members 20 and 21 of "invar" steel will not expand to any appreciable extent; consequently, tension is gradually placed upon the bars 20 and 21. This tends to straighten the bars 20 and 21 and when said bars are sufficiently straightened the contact members 34 and 35 will be separated, thus breaking the electric circuit to the heating unit. As the temperature of the body portion of the iron decreases said body portion will contract. This will permit or cause the members 20 and 21 to resume gradually their curved position and eventually to cause the contact members 34 and 35 again to engage, thus completing the circuit through the heating unit, thereby energizing the same and causing the iron again to be heated. The expansion and contraction of the base or body member of the iron will thus serve automatically to break or make the circuit through the heating unit as a result of a variation of relatively few degrees in temperature of the iron, so that the iron will be automatically maintained at a substantially uniform temperature.

The mechanism thus described provides for the automatic regulation of the temperature of the iron by a single unit. Where a plurality of heating units is employed, as is illustrated herein, the contact members are so arranged that the circuits leading to the heating units will be progressively broken. This is accomplished by placing the brackets supporting one of the pairs of contact members substantially centrally of the length of the members 20 and 21 and the other pair of contact members more closely adjacent the ends of said members or more nearly the looped portion as illustrated in Fig. 2.

In the construction illustrated herein the conductor 15 is also connected through the binding post 17 to one end of the wire 13 of the major heating unit, the other end of said wire being connected to the terminal 18. A conductor 39 leads from the binding post 18 to a binding post 40 which is mounted in a bracket 41 mounted upon but insulated from the thermostatic member 21 and is provided with a contact member 42, which is positioned to engage a complementary contact member 43 carried by a bracket 44 having a binding post 45 which is connected to the branch 46 of the conductor 16, which leads to the generator or power circuit. The actuation of the contact members 42 and 43 to make and break the circuit through the major heating unit is the same as that above described in reference to the actuation of the contact members which control the electric circuit to the minor heating unit.

By reason of the fact that the supports for the contact members 42 and 43 are closer to the end of the thermostatic members than the supports for the contact members 34 and 35, they will not be separated until the members 20 and 21 are considerably more nearly straightened than is required to separate the contact members 34 and 35. Consequently, the heating units will be progressively rendered inoperative as the temperature of the iron increases. By thus eliminating the effectiveness of the minor heating unit, when a predetermined temperature is reached, the amount of heat imparted to the iron is decreased and if the major heating unit is sufficient to maintain a desired temperature the minor heating unit will no longer be effective. If, however, the temperature decreases below the predetermined amount contacts will be made between the contact members 42 and 43 and additional heat imparted to the iron. By properly arranging the contact members for the major and minor heating units upon the bars 20 and 21, a very accurate degree of regulation may be obtained since if the temperature of the iron increases above another predetermined temperature, which may readily be determined, the contact members 42 and 43 will be separated, thus cutting off the current from both heating units, whereupon the iron will rapidly cool until the contact between the members 42 and 43 is again completed and the major heating unit energized.

In order to prevent arcing between the contact members 34, 35 and 42, 43 respectively by the slow separation of the contacts suitable condensers 47 and 48 are connected across the respective pairs of contact members as illustrated diagrammatically in Fig. 2.

In order that the thermostatic mechanism may be set to maintain the iron at any desired temperature, means are provided for adjusting the thermostatic device. This is accomplished in the present construction by the adjustment of the screw 28 which may be screwed inwardly or outwardly to impose more or less initial tension upon the members 20 and 21 of the non-expansible bar.

Obviously thermostatic members having a greater coefficient of expansion than that of the body of the iron may be similarly utilized and said thermostatic means may be given various other forms than that illustrated herein, it only being essential that the device shall be so constructed that the contact members shall be actuated by the movement of the thermostatic member when the body of the iron has reached a predetermined temperature or temperatures.

It will be understood that the embodiment of the invention disclosed herein is illustrative and not restrictive and that various changes in form, construction and arrangement of parts may be made within the spirit and scope of the following claims.

Having thus described my invention, what I claim as new, and desire to secure by Letters Patent, is:

1. A supporting base for a bare electric conductor comprising a plate having enameled tabs projecting therefrom providing insulating supports for the electric conductor.

2. A supporting base for a bare electric conductor comprising a metallic plate having an enameled surface and provided with enameled tabs formed integral therewith and projecting therefrom.

3. A supporting base for a bare electric conductor comprising a metallic plate having tabs bent from slotted portions of said plate and provided with an insulating covering to support said conductor.

4. An electric heater comprising a supporting plate having an enameled heat-reflecting surface and provided with enameled tabs projecting therefrom presenting insulated supports and a heating unit wire mounted on said tabs.

5. An electric heater comprising a supporting plate, for a heating unit wire, having an enameled heat-reflecting surface, and a series of pairs of oppositely disposed enameled tabs formed integral with said plate projecting therefrom and providing insulated supports for the heating unit wire.

6. An electric heater comprising a supporting plate, for electric heating unit wires, having an enameled heat-reflecting surface and a plurality of series of pairs of oppositely disposed enameled tabs formed integral with said plate projecting therefrom and providing insulated supports for the heating unit wires, the pairs of tabs of one series being of a different length than, and disposed in staggered relation to, the pairs of another series.

7. A flat iron comprising a base member, a heater having an enameled heat-reflecting surface, insulated members depending therefrom, a heating unit wire carried by said insulated members and means for supplying electric current to said heating unit wire.

8. A flat iron having a base member provided with a cavity extending downwardly from its upper surface, a plate having an enameled coating extending from said cavity and provided with a plurality of pairs of tabs depending into said cavity, a heating unit wire carried by said tabs and means for supplying an electric current to the heating unit wire.

9. A flat iron having a base member provided with a cavity extending downwardly from its upper surface, a plate covering said cavity, a plurality of series of tabs formed integral with said plate depending therefrom into said cavity and arranged in staggered relation, said plate and tabs having an enameled coating and a plurality of heating unit wires carried by said tabs.

In testimony whereof, I have signed my name to this specification.

WILFRED J. TURENNE.